July 2, 1935.  E. L. RATHBURN  2,006,367
CATALYZING OIL-GAS FUEL GENERATOR
Filed June 14, 1930
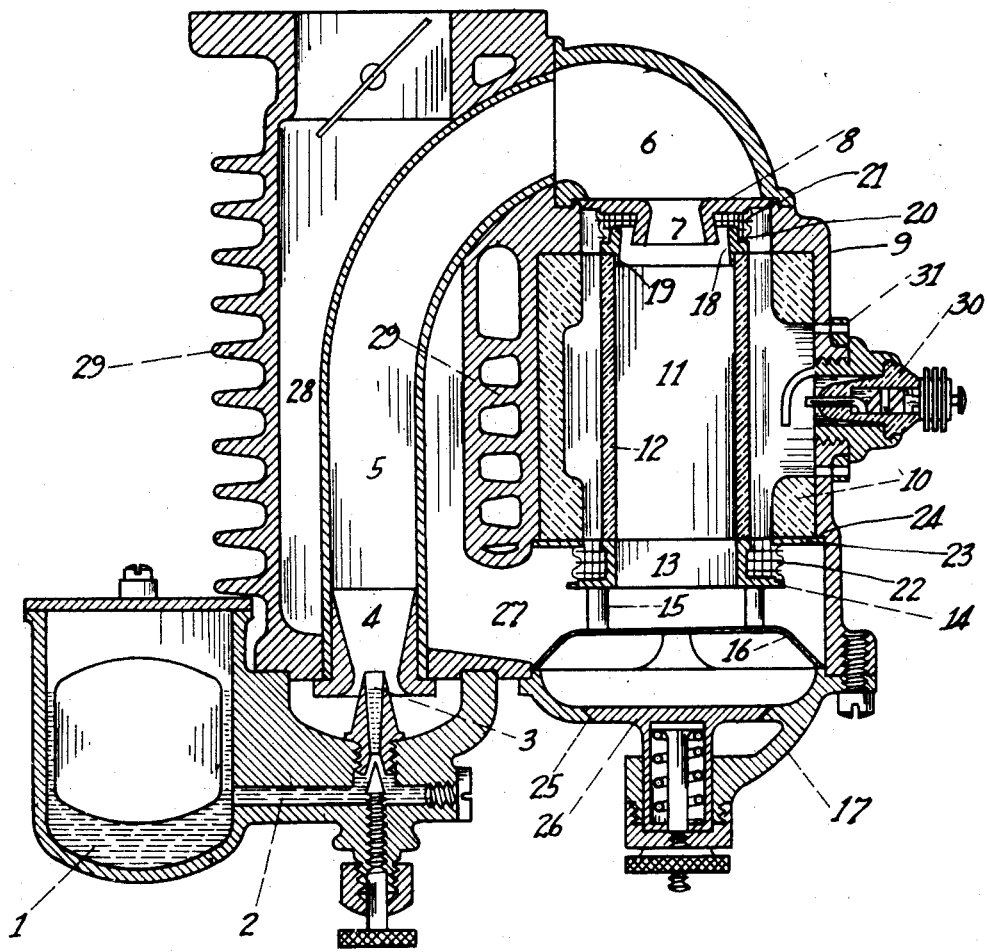
Emory Lee Rathburn,
INVENTOR,
BY Thomas G. Steward,
ATTORNEY

UNITED STATES PATENT OFFICE 2,006,367

CATALYZING OIL-GAS FUEL GENERATOR

Emory Lee Rathburn, Alexandria, Ind., assignor, by mesne assignments, to The Mantle Lamp Company of America, Chicago, Ill., a corporation of Illinois Application June 14, 1930, Serial No. 461,249

4 Claims. (Cl. 48—62)

The invention relates to means for forming a gaseous mixture for burners wherein a combustible fuel that is to be burned is mixed with air, and, generically considered, comprehends means for so treating the fuel and air, that the full thermal value of the combustible elements will be obtained.

This desired result is realized by, first, producing a mixture of fuel and air wherein the constituents either are insufficiently blended, or are not in such proportions as to fully satisfy the chemical affinities; second, subjecting the mixture to the influence of a catalyst whereby restricted combustion is induced, and, third, leading the mixture to a place wherein combustion is completed.

The invention will be best understood if reference be made to the accompanying drawing, in which the figure is a vertical sectional view of the apparatus.

Referring to the drawing, 1 is a constant-level oil chamber of any desirable type, having an outlet 2 leading to the valve-controlled jet orifice 3 of a Venturi mixer 4 which discharges into an initial mixing tube 5 wherein a more or less perfect blending of the vapor and air is effectuated, the upper end 6 of said mixing tube 5 being removable to admit of access to adjacent parts of the apparatus. Initially, the fuel level in the jet orifice 3 will be the same as the fuel level in the reservoir 1, as illustrated.

The mixing tube 5 terminates at a preferably flared nozzle 7 constituting part of a diaphragm 8 which is disposed between the upper end 6 of the mixing tube 5 and the casing 9 of the apparatus which preferably is lined with heat-insulating material 10. This nozzle 7 communicates with a chamber 11 of a tubular catalytic substance 12 of any known kind which is spaced from the lining 10 and is supported by a ring 13 having an outstanding flange 14 that is itself sustained by rods 15 extending upward from a spider 16 which rests on a valve casing 17 constituting a closure for the lower end of the casing 9.

Between the upper end of the catalytic tube 12 and the diaphragm 8, is a cap ring 18 having a downwardly-projecting flange 19 disposed within said catalytic tube 12, and having also an external shoulder 20 between which and said diaphragm 8 an annulus of wire gauze 21 is fixedly held. Another annulus of wire gauze 22 is held between the flange 14 of the ring 13, and a ring-shaped plate 23 extending beneath a shoulder 24 of the casing 9. These wire-gauze annuli, 21, 22, are in a gas-mixture course through the chamber 11 and the space within the lined casing 9, within which the mixture may flow in order that it may reach both the outer and the inner surface of the catalyst 12.

The valve casing 17 is provided with a seat 25 for a spring-actuated valve 26 which is held closed until the pressure on its upper side falls below atmospheric pressure on its lower side. From the valve casing 17 leads a duct 27 that is in communication with a cooling chamber 28 which is disposed around the mixing tube 5 and provided with ribs 29 for dissipating heat and lowering the temperature of the mixture flowing through it to the place of combustion, refrigeration of that mixture being supplemented by contact with the mixing tube 5 whose normal temperature is reduced by the evaporation of the fuel admitted through the Venturi tube 4.

Into the annular space between the lining 10 of the casing 9 and the tubular catalyst 12, projects a spark plug 30 proximate which are valve-controlled air openings 31 through which air may be admitted to support combustion in said space and initially heat said catalyst 12 to the temperature at which it will be capable of inducing partial combustion of an abnormally-rich mixture. After the catalyst is sufficiently heated, the air openings 31 should be closed in order that only a limited catalytically-induced and flameless combustion of the mixture will take place within said annular space. Also, the current for the spark plug should be discontinued.

The operation of the apparatus is as follows:

Air passes at 3a around the jet orifice 3 of the Venturi mixer 4, and into the initial mixing tube 5, 6, from which tube it flows downward through the flared nozzle 7, into the chamber 11 of the tubular catalyst 12, and thence into the duct 27 which may lead past a throttle valve 27a to a suitable place of combustion within which the pressure is below that in the Venturi mixer 4.

The flared nozzle 7 is so shaped and proportioned relatively to the tubular catalyst 12 that a zone of low pressure is created at the wire-gauze annulus 21 into which zone increments of the mixture will inductively flow from the space outside of the tubular catalyst 12, replenishing increments of the mixture at the same time being admitted through the wire-gauze annulus 22 into that space.

Preferably, the capacity of the openings in the annulus 21 will be greater than the capacity of the openings in the annulus 22, whereby the flow of the mixture into the space around the tubular catalyst 12 will be restricted to thereby lower the pressure in said space to that point at which the desired thermal result will be attained by the action of the catalyst.

The material of which the tubular element 12 is composed may be any catalytic substance which is capable of inducing combustion of small portions of the flowing mixture, to thereby produce products which may be blended with and advantageously heat the entire mixture as it flows to the place of combustion, a highly-efficient catalytic substance being preferable.

Having thus described my invention, what I claim is:

1. A catalyzing oil gas generator including a source of liquid fuel, a mixing tube for liquid fuel and air, a tubular catalyst communicating with said mixing tube, a wall surrounding and spaced from said tubular catalyst and enclosing an annular space therewith, there being openings above and below said tubular catalyst for establishing a circuit around and through said tubular catalyst, and an outlet conduit surrounding said mixing tube and communicating with the bottom of said tubular catalyst.

2. A catalyzing oil gas generator including a source of liquid fuel, a mixing tube for liquid fuel and air, a tubular catalyst communicating with said mixing tube, a wall surrounding and spaced from said tubular catalyst and enclosing an annular space therewith, there being openings above and below said tubular catalyst for establishing a circuit around and through said tubular catalyst through said space, wire-gauze annuli disposed in said openings, and an outlet conduit communicating with the bottom of said tubular catalyst.

3. A catalyzing oil gas generator including a source of liquid fuel, a mixing tube for liquid fuel and air, a tubular catalyst communicating with said mixing tube, means for initiating combustion outside of said tubular catalyst, a wall surrounding and spaced from said tubular catalyst and enclosing an annular space therewith, there being openings above and below said tubular catalyst for establishing a circuit around and through said tubular catalyst, and an outlet conduit communicating with the bottom of said tubular catalyst.

4. A catalyzing oil gas generator including a source of liquid fuel, a mixing tube for liquid fuel and air, a cooling chamber around said mixing tube, a tubular catalyst communicating with said mixing tube, a wall surrounding and spaced from said tubular catalyst and enclosing an annular space therewith, there being openings above and below said tubular catalyst for establishing a circuit around and through said tubular catalyst, and an outlet conduit communicating with the bottom of said tubular catalyst.

EMORY LEE RATHBURN.

CERTIFICATE OF CORRECTION.

Patent No. 2,006,367.                                                  July 2, 1935.

EMORY LEE RATHBURN.

It is hereby certified that error appears in the printed specification of the above numbered patent requiring correction as follows: Page 2, second column, line 3, claim 2, strike out the words "through said space; and that the said Letters Patent should be read with this correction therein that the same may conform to the record of the case in the Patent Office.

Signed and sealed this 7th day of April, A. D. 1936.

Leslie Frazer (Seal)                          Acting Commissioner of Patents.